United States Patent
Tavakoli Shiraji et al.

(10) Patent No.: US 9,680,531 B2
(45) Date of Patent: Jun. 13, 2017

(54) SYSTEM AND METHOD FOR DETECTING INADEQUATE WIRELESS COUPLING AND IMPROVING IN-BAND SIGNALING IN WIRELESS POWER TRANSFER SYSTEMS

(71) Applicant: QUALCOMM Incorporated, San Diego, CA (US)

(72) Inventors: Houman Tavakoli Shiraji, San Diego, CA (US); Zhen Ning Low, San Diego, CA (US); Michael Carlile Bailey, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 14/607,958

(22) Filed: Jan. 28, 2015

(65) Prior Publication Data

US 2016/0036497 A1 Feb. 4, 2016

Related U.S. Application Data

(60) Provisional application No. 62/032,396, filed on Aug. 1, 2014.

(51) Int. Cl.
*H04B 5/00* (2006.01)
*H04B 1/18* (2006.01)
*H04B 1/10* (2006.01)
*H02J 5/00* (2016.01)
*H02J 7/02* (2016.01)

(52) U.S. Cl.
CPC ............ *H04B 5/0037* (2013.01); *H02J 5/005* (2013.01); *H04B 1/1018* (2013.01); *H04B 1/18* (2013.01); *H04B 5/0075* (2013.01); *H02J 7/025* (2013.01); *H04B 5/0031* (2013.01)

(58) Field of Classification Search
CPC .. H02J 5/005; H02J 7/025; H02J 17/00; H02J 50/10; H02J 50/80; H04B 1/1018; H04B 1/18; H04B 5/0031; H04B 5/0037
See application file for complete search history.

(56) References Cited

U.S. PATENT DOCUMENTS 5,260,701 A 11/1993 Guern et al.
8,502,497 B2 8/2013 Pijnenburg et al.
(Continued)

OTHER PUBLICATIONS

International Search Report and Written Opinion—PCT/US2015/038835—ISA/EPO—Oct. 22, 2015.

*Primary Examiner* — Devan Sandiford
(74) *Attorney, Agent, or Firm* — Knobbe, Martens, Olson & Bear, LLP (57) ABSTRACT

An apparatus for receiving wireless power is provided. The apparatus comprises a receive coupler configured to receive the wireless power from a wireless power transmitter. The apparatus comprises a receive circuit electrically connected to the receive coupler, the receive circuit configured to provide power to a load. The apparatus comprises a controller circuit configured to provide a first amount of power from the receive circuit to the load. The controller circuit is further configured to reduce the first amount of power to a second amount of power for a duration of communication with the wireless power transmitter to increase a difference between a first impedance and a second impedance of the receive circuit compared to when the first amount of power is provided to the load.

27 Claims, 7 Drawing Sheets

(56) References Cited

U.S. PATENT DOCUMENTS

| | | | |
|---|---|---|---|
| 2009/0127937 A1* | 5/2009 | Widmer | H02J 5/005 307/149 |
| 2010/0151808 A1 | 6/2010 | Toncich et al. | |
| 2012/0038220 A1 | 2/2012 | Kim et al. | |
| 2012/0153894 A1 | 6/2012 | Widmer | |
| 2012/0293006 A1 | 11/2012 | Kim et al. | |
| 2012/0293118 A1 | 11/2012 | Kim et al. | |
| 2012/0329405 A1 | 12/2012 | Lee et al. | |
| 2013/0043735 A1 | 2/2013 | Low et al. | |
| 2013/0062966 A1 | 3/2013 | Verghese et al. | |
| 2013/0063083 A1* | 3/2013 | Park | H02J 7/0013 320/108 |
| 2014/0159654 A1 | 6/2014 | Lee et al. | |
| 2015/0155095 A1* | 6/2015 | Wu | H02J 17/00 307/104 |
| 2016/0056640 A1* | 2/2016 | Mao | H02J 50/80 307/104 |
| 2016/0221451 A1* | 8/2016 | Plum | H02J 17/00 |

* cited by examiner

SYSTEM AND METHOD FOR DETECTING INADEQUATE WIRELESS COUPLING AND IMPROVING IN-BAND SIGNALING IN WIRELESS POWER TRANSFER SYSTEMS

CLAIM OF PRIORITY UNDER 35 U.S.C. §119

The present application for patent claims priority to Provisional Application No. 62/032,396 entitled "SYSTEM AND METHOD FOR DETECTING INADEQUATE WIRELESS COUPLING AND IMPROVING IN-BAND SIGNALING IN WIRELESS POWER TRANSFER SYSTEMS" filed. Aug. 1, 2014, and assigned to the assignee hereof. Provisional Application No. 62/032,396 is hereby expressly incorporated by reference herein.

FIELD

The described technology generally relates to wireless power. More specifically, the disclosure is directed to devices, systems, and methods for detecting inadequate wireless coupling and improving in-band signaling in wireless power transfer systems.

BACKGROUND

Under inadequate wireless coupling conditions between a wireless power transmitter (e.g., a wireless charging device) and a wireless power receiver (e.g., a wirelessly chargeable device), communications from the wireless power receiver to the wireless power transmitter via modulation of the wireless field used for power transfer (also referred to herein as "in-band" communications) may not be reliably received and/or processed by the wireless power transmitter. Without reliable communications between the wireless power receiver and the wireless power transmitter to indicate the wireless power receiver's presence, the wireless power charger may undesirably disable continuous transmission of wireless power to save energy by entering an intermittently powered mode sometimes referred to as a "beacon mode." Accordingly, devices, systems and methods for detecting inadequate wireless coupling and improving in-band signaling in wireless power transfer systems are desirable.

SUMMARY

According to some implementations, an apparatus for receiving wireless power is provided. The apparatus comprises a receive coupler configured to receive the wireless power from a wireless power transmitter. The apparatus comprises a receive circuit electrically connected to the receive coupler, the receive circuit configured to provide power to a load. The apparatus comprises a controller circuit configured to provide a first amount of power from the receive circuit to the load. The controller circuit is further configured to reduce the first amount of power to a second amount of power for a duration of communication with the wireless power transmitter to increase a difference between a first impedance and a second impedance of the receive circuit compared to when the first amount of power is provided to the load.

According to other implementations, a method for receiving wireless power by a wireless power receiver is provided. The method comprises receiving wireless power from a wireless power transmitter via a receive coupler of the wireless power receiver for providing a power to a load. The method comprises providing a first amount of power to the load from a receive circuit electrically connected to the receive coupler. The method comprises reducing the first amount of power to a second amount of power for a duration of communication with the wireless power transmitter to increase a difference between a first impedance and a second impedance of the receive circuit compared to when the first amount of power is provided to the load.

According to yet other implementations, a non-transitory computer-readable medium comprising code is provided. When executed, the code causes a wireless power receiver to receive wireless power from a wireless power transmitter via a receive coupler of the wireless power receiver for providing a power to a load. When executed, the code also causes the wireless power receiver to provide a first amount of power to the load from a receive circuit electrically connected to the receive coupler. When executed, the code also causes the wireless power receiver to reduce the first amount of power to a second amount of power for a duration of communication with the wireless power transmitter to increase a difference between a first impedance and a second impedance of the receive circuit compared to when the first amount of power is provided to the load.

According to yet other implementations, an apparatus for receiving wireless power is provided. The apparatus comprises means for coupling wireless power from a wireless power transmitter. The apparatus comprises means for providing a first amount of power to a load. The apparatus comprises means for reducing the first amount of power to a second amount of power for a duration of communication with the wireless power transmitter to increase a difference between a first impedance and a second impedance of the apparatus compared to when the first amount of power is provided to the load.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

Figure 1:
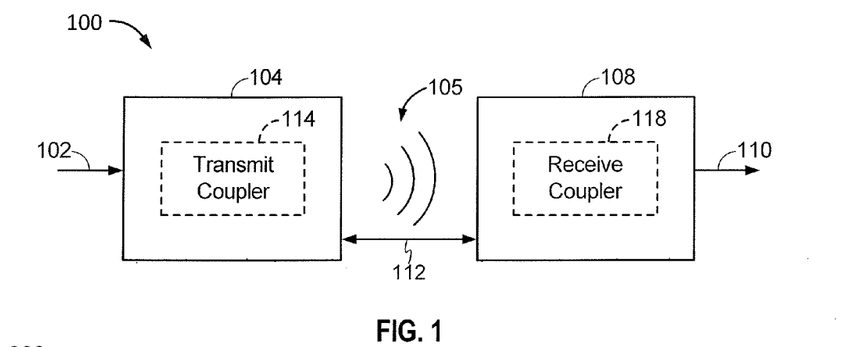
FIG. 1 is a functional block diagram of a wireless power transfer system, in accordance with an exemplary implementation.

FIG. 1 is a functional block diagram of a wireless power transfer system 100, in accordance with some exemplary implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 may couple to the wireless field 105 and generate output power 110 for storing or consumption by a device (not shown in this figure) coupled to the output power 110. Both the transmitter 104 and the receiver 108 are separated by a distance 112.

In one example implementation, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be reduced. For example, the efficiency may be less when resonance is not matched. Transfer of energy occurs by coupling energy from the wireless field 105 of the transmit coupler 114 to the receive coupler 118, residing in the vicinity of the wireless field 105, rather than propagating the energy from the transmit coupler 114 into free space. Resonant inductive coupling techniques may thus allow for improved efficiency and power transfer over various distances and with a variety of inductive coupler configurations.

In some implementations, the wireless field 105 corresponds to the "near-field" of the transmitter 104 The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

Efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118.

Figure 2:
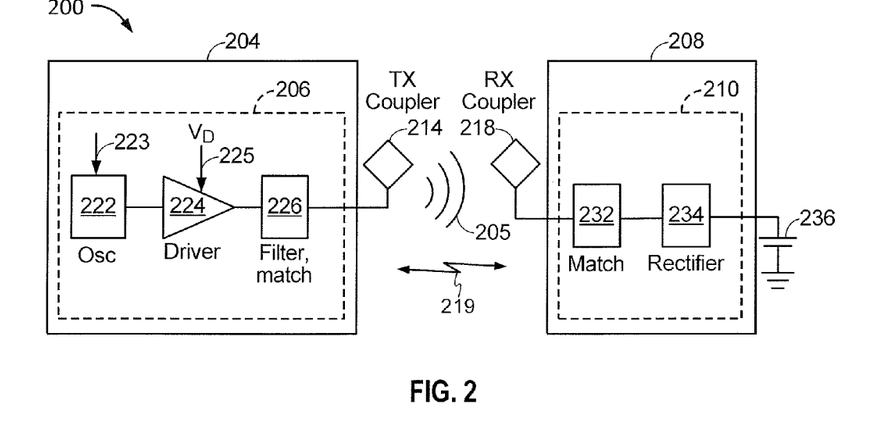
FIG. 2 is a functional block diagram of a wireless power transfer system, in accordance with another exemplary implementation.

FIG. 2 is a functional block diagram of a wireless power transfer system 200, in accordance with some other exemplary implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of transmit circuitry 206 to the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
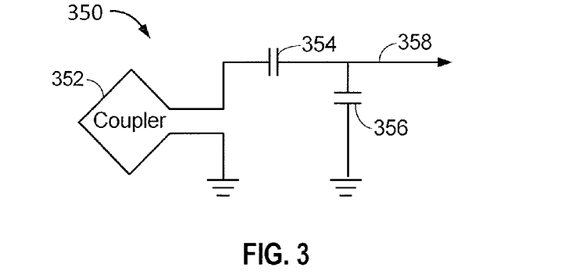
FIG. 3 is a schematic diagram of a portion of transmit circuitry or receive circuitry of FIG. 2 including a transmit or receive antenna, in accordance with some exemplary implementations.

FIG. 3 is a schematic diagram of a portion of the transmit circuitry 206 or the receive circuitry 210 of FIG. 2, in accordance with some exemplary implementations. As illustrated in FIG. 3, a transmit or receive circuitry 350 may include a coupler 352. The coupler 352 may also be referred to or be configured as a "conductor loop." a coil, an inductor, or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both the transmit coupler 214 and the receive coupler 218 increases. For transmit couplers, the signal 358, with a frequency that substantially corresponds to the resonant frequency of the coupler 352, may be an input to the coupler 352.

Figure 4:
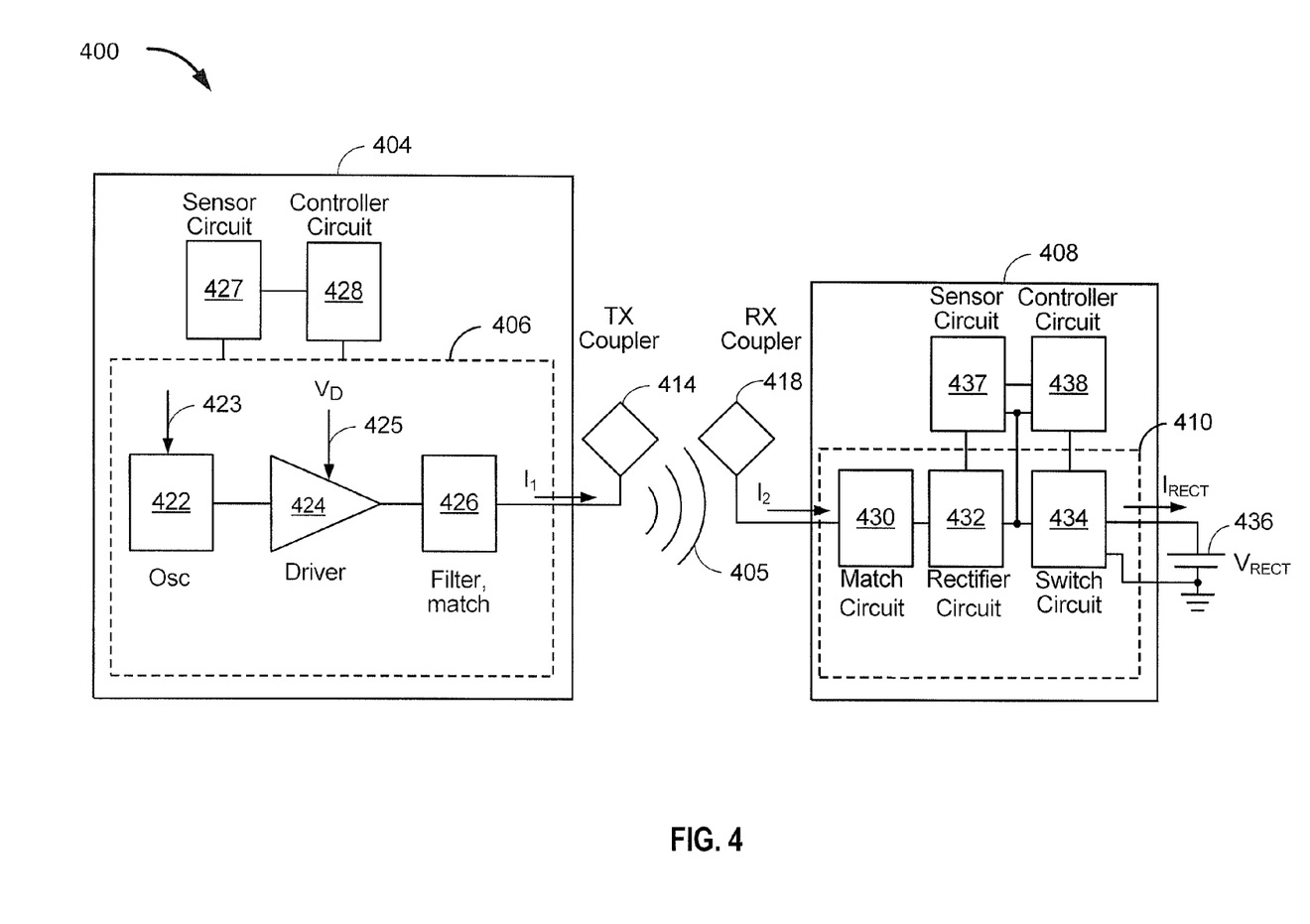
FIG. 4 is a functional block diagram of a wireless power transfer system, in accordance with an exemplary implementation.

FIG. 4 is a functional block diagram of a Wireless power transfer system 400, in accordance with an exemplary implementation. The system 400 includes a wireless power transmitter 404 (e.g., a wireless power charger) and a wireless power receiver 408. The transmitter 404 includes a transmit circuit 406, comprising an oscillator 422, a driver circuit 424, and a filter and matching circuit 426. The oscillator 422 is configured to generate a signal at a desired frequency that may be adjusted in response to a frequency control signal 423. The oscillator 422 provides the oscillator signal to the driver circuit 424. The driver circuit 424 is configured to drive a transmit coupler 414 at, for example, a resonant frequency of the transmit coupler 414 based on an input voltage signal ($V_D$) 425.

The filter and matching circuit 426 is configured to filter out harmonics or other unwanted frequencies and may match the impedance of the transmit circuit 406 to the impedance of the transmit coupler 414. As a result of driving the transmit coupler 414, the transmit coupler 414 generates a wireless field 405 to wirelessly output power at a level sufficient for powering a chargeable device and/or charging a battery 436 of the chargeable device, for example. Unless stated otherwise, each component within the transmit circuit 406 may have substantially the same functionality as the respective component within the transmit circuitry 206, as previously described in connection with FIG. 2.

The transmitter 404 further includes a controller circuit 428 electrically connected to a sensor circuit 427. Both the controller circuit 428 and the sensor circuit 427 may be coupled to the transmit circuit 406. The sensor circuit 427 is configured to measure a current or voltage output by the transmit circuit 406 to the transmit coupler 414 and communicates that information to the controller circuit 428. In some implementations, the sensor circuit 427 comprises an analog-to-digital converter (ADC) measures the current or voltage output by the transmit circuit 406 and converts it to a proportional digital signal. The controller circuit 428 may utilize this information to, determine an apparent load impedance. The controller circuit 428 utilizes the information indicative of the apparent load impedance to determine whether the receiver 408 is present in the vicinity of the wireless field 405. In addition, the controller circuit 428 may utilize this information to receive and process signals or communications from the receiver 408, as will be described in greater detail below.

The receiver 408 includes a receive coupler 418 electrically connected to a receive circuit 410 and a battery 436 or to a chargeable device comprising the battery 436 connected to the receive circuit 410. The receive circuit 410 may include a match circuit 430, a rectifier circuit 432, and a switch circuit 434. The receive coupler 418 may be electrically connected to the match circuit 430. The match circuit 430 may be electrically connected to the rectifier circuit 432.

The rectifier circuit 432 may be electrically connected to the switch circuit 434. The switch circuit 434 may selectively connect the rectifier circuit 432 to the battery 436 or to the chargeable device comprising the battery 436 such that a DC voltage driving a DC current ($I_{RECT}$) may be selectively provided to the battery 436 and/or to the chargeable device comprising the battery 436 based on a state of operation of the receiver 408, as will be described in greater detail in connection with FIGS. 5-10 below. In addition, under certain circumstances the switch circuit 434 may disconnect the rectifier circuit 432 from the chargeable device or battery 436 in order to modify an amount of change in a load impedance measured or detected by the transmitter 404 when the switch circuit 434 connects and disconnects the rectifier circuit 432 to and from the chargeable device and/or the battery 436 during in-band signaling between the receiver 408 and the transmitter 404 (e.g., to modulate the wireless field 405), as will be described in more detail in connection with FIGS. 5-7 below. Unless stated otherwise, each component within the receive circuit 410 may have substantially the same functionality as the respective component within the receive circuit 210 as previously described in connection with FIG. 2.

To provide power from the transmitter 404 to the receiver 408, energy may be transmitted from the transmit coupler 414 to the receive coupler 418 through a wireless field (e.g., a magnetic or electromagnetic field) 405. The transmit coupler 414 and the transmit circuit 406 form a resonant circuit having a particular resonant frequency. The receive coupler 418 and the receive circuit 410 form another resonant circuit having a particular resonant frequency. Because losses are minimized between two coupled resonant systems having the same resonant frequency, it is desirable for the resonant frequency associated with the receive coupler 418 to be substantially the same as the resonant frequency associated with the transmit coupler 414.

In some implementations, the transmit circuit 406 outputs an AC current $I_1$, e.g., sometimes referred to as a primary current, to the transmit coupler 414. The transmit coupler 414 produces the wireless field 405 based on the current $I_1$. When substantially aligned with the transmit coupler 414, the receive coupler 418 may be located substantially within the wireless field 405. Thus, the receive coupler 418 may be magnetically or electromagnetically coupled to the transmit coupler 414. The wireless field 405 induces an AC current $I_2$, e.g., sometimes referred to as a secondary current, in the receive coupler 418. In one or more charging modes, the rectifier circuit 432 converts the AC current $I_2$ into a direct current (DC) current $I_{RECT}$ driven by the DC rectified voltage $V_{RECT}$ for powering the receiver 408 and/or the chargeable device, and/or for charging the battery 436.

In some implementations, communications from the wireless power receiver to the wireless power transmitter via modulation of the wireless field used for power transfer may be referred to as in-band signaling. In some implementations, in-band signaling from the receiver 408 to the transmitter 404 via the wireless field 405 may comprise toggling a switch (switch circuit 434) within the receiver 408 to adjust or toggle an impedance of the receiver 408 or of the receive circuit 410 as presented to and detectable by the transmitter 404, between a first value and a second value. The second value is less than the first value. The transmitter 404 may process these changes in apparent impedance of the receiver 408 or receive circuit 410 as information signaling (e.g., via ON-OFF keying). Thus, in-band signaling may comprise wirelessly communicating utilizing the same medium and components used for the wireless power transfer. In some implementations, in-band signaling may be utilized to detect the presence of the receiver 408 for initiating wireless power transmission and/or to ensure the receiver 408 is accurately communicating with the transmitter 404. In such implementations, it may be advantageous that the in-band signaling have a signal-to-noise ratio high enough for the transmitter 404 to accurately detect the presence of the receiver 408 and/or detect any in-band communications from the receiver 408. In some implementations, disconnecting a load or reducing an amount of voltage, current, or power provided to the load (e.g., the chargeable device or battery 436), as will be described in more detail below, may increase the accuracy of such a presence detection function by increasing a signal-to-noise ratio of the in-band signaling thereby reducing a level of interference detectable at the transmitter 404 caused by variations in the impedance of the load presented by the receiver 408. While one exemplary implementation of in-band signaling has been described above, any other implementation that accomplishes modulation of the wireless field for communication is contemplated.

The receiver 408 may further include a sensor circuit 437 configured to sense a DC voltage (e.g., $V_{RECT}$) and/or a DC current ($I_{RECT}$) output from the rectifier circuit 432. In some implementations, the sensor circuit 437 may be configured to measure any characteristic that may be indicative of a level of coupling between the receive coupler 418 and the transmit coupler 414. A controller circuit 438 may be electrically connected to, and receive sensor data from, the sensor circuit 437. The controller circuit 438 may be configured to control at least the switch circuit 434 for discontinuing or reducing an amount of voltage, current, or power provided to the chargeable device or battery 436 during in-band signaling, as will be described in greater detail below.

In some implementations, $V_{RECT}$ may also provide power to the receiver 408 and/or any components therein. Thus, $V_{RECT}$ may drive both a system current (e.g., for powering the receiver 408 and/or the chargeable device) as well as a charging current (e.g., for charging the battery 436 of the chargeable device). In some implementations, the system current is implicitly or explicitly switched or reduced during in-band signaling and/or measurement of $V_{RECT}/I_{RECT}$, as will be described in more detail in connection with FIGS. 5-7. The charging current may also be explicitly switched or reduced by the switching circuit 434.

Figure 5:
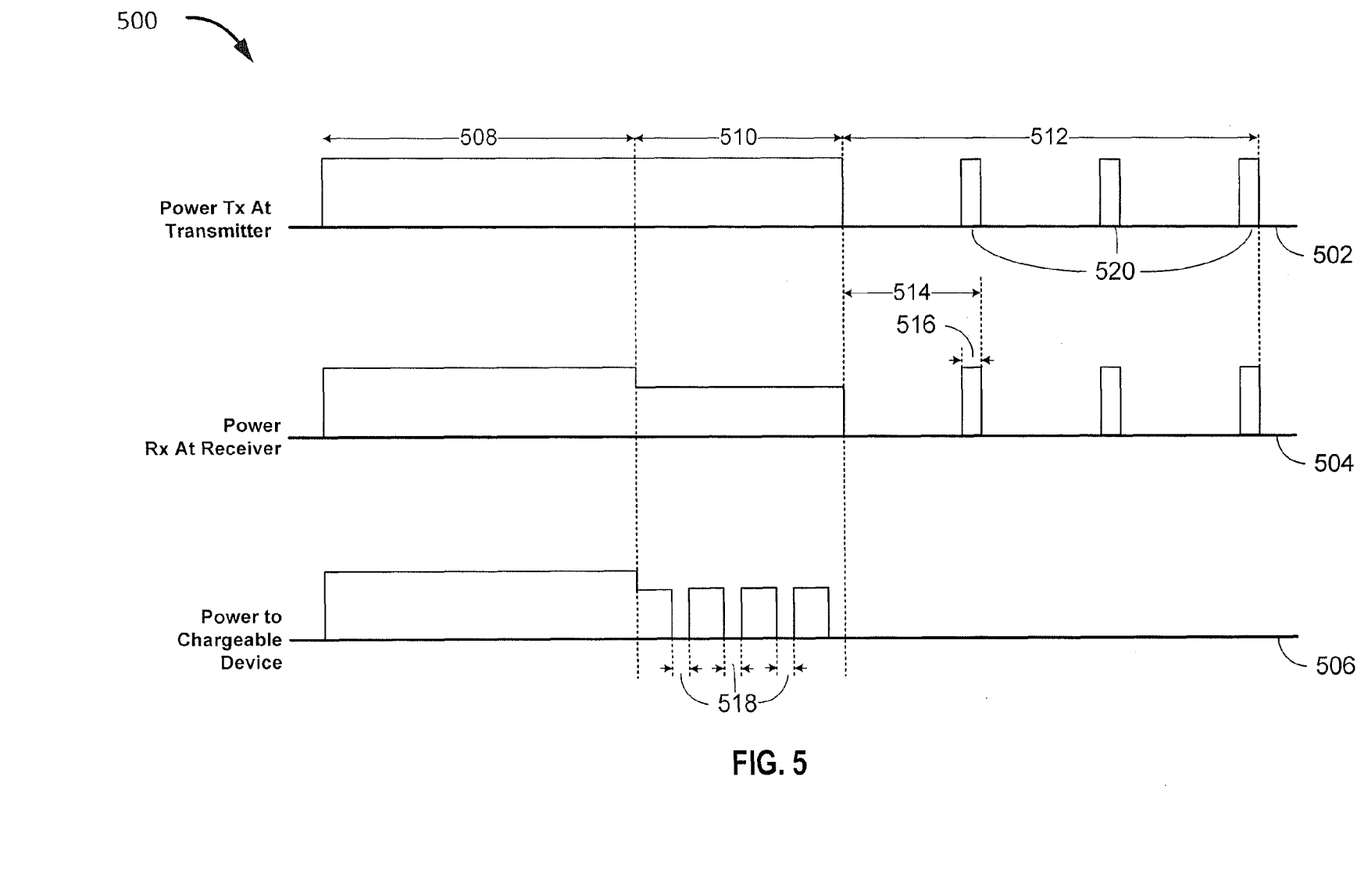
FIG. 5 is a timing diagram illustrating a plurality of charging modes of the wireless power transfer system of FIG. 4.

FIG. 5 is a timing diagram 500 illustrating a plurality of charging modes of the wireless power transfer system 400 of FIG. 4. As shown in FIG. 5, the timing diagram 500 includes a first timeline 502 depicting an amount of power transmitted by the power transmitter 404 (FIG. 4), a second timeline 504 depicting an amount of power received by the power receiver 408 (FIG. 4), and a third timeline 506 depicting an amount of power provided by the power receiver 408 to a chargeable device and/or battery 436 of the chargeable device (e.g., to the chargeable device itself or specifically to the battery 436 of the chargeable device in FIG. 4). In each of the timelines 502, 504 and 506, the x-axis corresponds to the passage of time, while the y-axis corresponds to an amount of power transmitted by the transmitter 404, received by the receiver 408, or provided to the chargeable device or to the battery 436 of the chargeable device by the receiver 408, respectively.

For the purpose of illustration, the timing diagram 500 shows a plurality of intervals (e.g., intervals 508, 510 and 512) each corresponding to a respective one of a plurality of charging states or modes. For example, a first interval 508 corresponds to a "good wireless field" mode where the receiver 408 is wirelessly coupled with the power transmitter 404 and a good wireless field is present. For example, a "good" wireless field may be a wireless field having sufficient strength to allow both 1) powering or charging of a chargeable device or battery 436 connected to the receiver 408 and 2) a coupling between the receiver 408 and the transmitter 404 sufficient (e.g., above a threshold) for the transmitter 404 to reliably differentiate between a low load impedance state and a high load impedance state of the receiver 408 during in-band signaling communications from the receiver 408 to the transmitter 404.

In the first interval 508, as shown in the first timeline 502, the transmitter 404 transmits a first amount of power sufficient for the receiver 408 to receive, rectify and pass power to the chargeable device or battery 436 for powering the chargeable device and/or for charging the battery 436 of the chargeable device. As shown in the first interval 508 of the second timeline 504, the receiver 408 wirelessly receives the first amount of power from the transmitter 404. As shown in the first interval 508 of the third timeline 506, the receiver 408 rectifies the first amount of power and passes an amount of rectified power to the chargeable device and/or the battery 436. Thus, in the first interval 508, which may correspond to the "good wireless field" state or mode, the transmitter 404 continuously transmits power wirelessly to the receiver 408 and the receiver 408 continuously rectifies and passes the power to the chargeable device and/or the battery 436, even during in-band signaling communication from the receiver 408 to the transmitter 404.

A second interval 510 corresponds to a "pulse charging" mode or state where the wireless field generated by the transmitter 404 has a lower strength than in the first interval 508, while still having sufficient strength to wirelessly transfer enough energy to power and/or charge the chargeable device and/or the battery 436. However, in the second interval 510 a level or amount of coupling between the receiver 408 and the transmitter 404 may be below a threshold such that the transmitter 404 may not be able to adequately and reliably differentiate between a low load impedance state and a high load impedance state of the receiver 408 or the receive circuit 410 that may be utilized for in-band signaling communications. However, by reducing or completely discontinuing a supply of power for running and/or charging the chargeable device or the battery 436 while in-band signaling is performed between the receiver 408 and the transmitter 404, an apparent load of the receiver 408 and/or the receive circuit 410 may be reduced. The reduction in the apparent load of the receiver 408 may be reduced sufficiently such that a difference between the low load impedance state and the high load impedance state of the receiver 408 utilized during in-band communication is absolutely greater, or relatively greater as compared to the absolute value of the high or low load impedance state, than if the supply of power to the chargeable device and/or battery 436 were not reduced or discontinued during in-band signaling.

As shown in the second interval 510 of the first timeline 502, the transmitter 404 may transmit the first amount of power as in the first interval 508. However, as shown in the second timeline 504, the receiver 408 may be located in such an orientation or location such that a coupling between the receiver 408 and the transmitter 404 is reduced as compared to the first interval 508. Thus, even if a same amount of power (e.g., the first amount of wireless power) is wirelessly transmitted by the transmitter 404, the receiver 408 may only receive a second amount of power less than the first amount of power. This second amount of power, as shown by the reduced height of the power depicted in the second interval 510 as compared to the first interval 508 of the second timeline 504, may still be sufficient to power and/or charge the chargeable device or the battery 436. However, the reduced amount of coupling between the receiver 408 and the transmitter 404 may be such that the transmitter 404 may have difficulty in reliably identifying or processing in-band signaling from the receiver 408 while the receiver 408 is also passing power to the chargeable device or battery 436.

As previously described in connection with FIG. 4, the switch circuit 434 is configured to discontinue the rectified power provided to the chargeable device or battery 436 during intervals 518 when the receiver 408 is performing in-band signaling with the transmitter 404, while still continuously receiving wireless power from the transmitter 404. This reducing or discontinuing of power provided to the chargeable device or battery 436 is different from any action or process that may reduce or discontinue power to the chargeable device or battery 436 in the action of in-band signaling itself. For example, power provided to the chargeable device may be discontinued or reduced for an entire interval during which the apparent load impedance of the receiver 408 is separately toggled to provide modulation of the wireless field 405 during the in-band signaling to the transmitter 404.

In some other implementations, rather than completely discontinuing the rectified power, an amount of rectified current (e.g., $I_{RECT}$) provided to the chargeable device and/or the battery 436 may be reduced (e.g., in one or more steps) based at least in part on a number of in-band signals, symbols, or sessions that are not reliably received or processed by the transmitter 404. Moreover, in some other implementations several wireless power receivers may be simultaneously receiving wireless power from, and performing in-band signaling with, the same wireless power transmitter 404. In such implementations, each of the wireless power receivers may disable or reduce charging power provided to the respective chargeable devices in a coordinated fashion (e.g., synchronized in time) to provide a period of increased signal-to-noise (e.g., the larger relative impedance swing as detected at the transmitter) while performing in-band signaling.

A third interval 512 may correspond to a "beacon" mode or state of the transmitter 404, where no receiver (e.g., the receiver 408) is sensed by the transmitter 404 and the transmitter 404 discontinues transmitting wireless power except during periodic beacons 520 in order to save power and/or to increase efficiency. The beacons 520 may function to broadcast the presence of the transmitter 404 and for determining the presence of any compatible receivers in the vicinity of the transmitter 404. In some implementations, the beacons 520 may have a duration 516 (e.g., of approximately 100 ms) and a period 514 (e.g., of approximately 1 second). As shown in the third interval 512 of the first timeline 502, in such a mode, the transmitter 404 may transmit a beacon 520 having the duration 516 and the period 514. As shown in the third interval 512 of the second timeline 504, if the receiver 408 is in the vicinity of the wireless field 405 produced by the transmitter 404, the receiver 408 may receive wireless power intermittently during the beacons 520. As shown in the third interval 512 of the third timeline 506, the receiver 408 may not provide any power derived from the beacons 520 to the chargeable device or battery 436 during the "beacon" mode.

Figure 6:
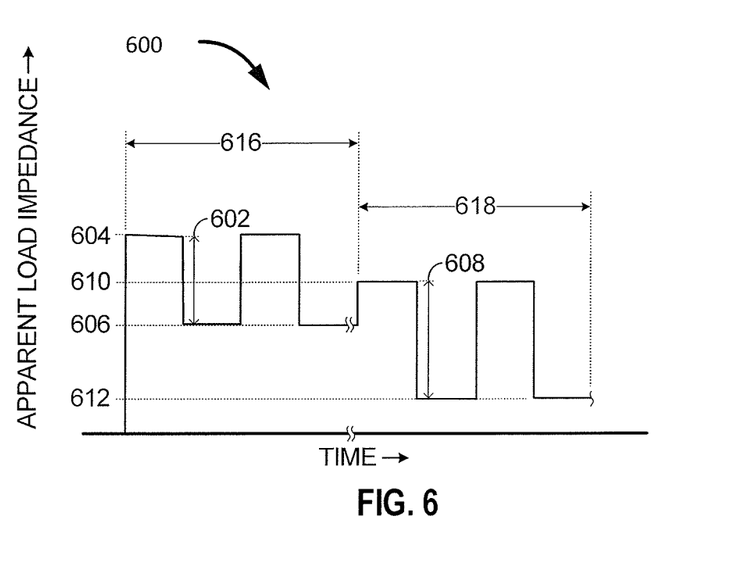
FIG. 6 is a diagram illustrating an apparent load impedance of a receiver as detected by a transmitter during in-band signaling, in accordance with an exemplary implementation.

FIG. 6 is a diagram 600 illustrating an apparent load impedance of a receiver 408 (FIG. 4) as detected by a transmitter 404 (FIG. 4) during in-band signaling, in accordance with an exemplary implementation. As shown in FIG. 6, diagram 600 may comprise two intervals 616 and 618. Although shown adjacent to one another, the first and second intervals 616 and 618 are not necessarily so and may occur during separate time periods that are not adjacent to one another in time (as shown by the double squiggly lines breaking the load impedance line and the TIME axis). Moreover, although particular relations between high and low apparent load impedances are shown and/or described in connection with diagram 600, such relations and/or illustrated values are only exemplary and may take on any other values, according to the particular implementation.

A first interval 616 may show a time period during which wireless power is transmitted by the transmitter 404, received by the receiver 408, and provided to a chargeable device or battery 436 by the receiver 408 while the receiver 408 is performing in-band signaling communication with the transmitter 404. As shown in the first interval 616, the transmitter 404 may detect a first (high) apparent impedance 604 of the receiver 408, which may correspond to an apparent impedance of the receiver 408 during an "ON" portion of ON/OFF keying in-band signaling. Likewise, the transmitter 404 may detect a second (low) apparent impedance 606 of the receiver 408, which may correspond to an apparent impedance of the receiver 408 during an "OFF" portion of the ON/OFF keying during in-band signaling. The difference 602 between the first (high) value 604 and the second (low) value 606 may be a "swing" of the impedance from "ON" to "OFF" portions of the in-band signaling while the receiver 408 is providing power to the chargeable device.

A second interval 618 may show a time period during which wireless power is being transmitted by a transmitter 404, received by a receiver 408, but where power is either not provided, or provided in a reduced amount, to a chargeable device or battery 436 by the receiver 408 while the receiver 408 is performing in-band signaling to communicate with the transmitter 404. In some implementations, the interval 618 may correspond to the interval 518 of FIG. 5. As shown in the second interval 618, the transmitter 404 may detect another first (high) apparent impedance 610 of the receiver 408, which may correspond to an apparent impedance of the receiver 408 during an "ON" portion of the ON/OFF keying during in-band signaling. Note that the value 610 is lower than the value 604. This is because the portion of the apparent loading impedance of the receiver 408 as detected by the transmitter 404 due to the chargeable device and/or battery 436 drawing power from the receiver 408 is either not present or significantly reduced as compared to interval 616. Likewise, the transmitter 404 may detect another second (low) apparent impedance 612 of the receiver, which may correspond to an apparent impedance of the receiver during an "OFF" portion of the ON/OFF keying during in-band signaling. Note that the value 612 is lower than the value 606 for the same reason as described above for 608. The difference 608 between the first (high) value 610 and the second (low) value 612 may be a "swing" of the impedance from "ON" to "OFF" portions of the in-band signaling while the receiver 408 is either not providing power, or providing a reduced amount of power, to the chargeable device.

As shown, in some implementations, the difference 608 may be larger than the difference 602 in terms of absolute magnitude. In some other implementations, the difference 608 may have substantially the same absolute magnitude as 602 but, since the first and second (high and low) impedance values 610 and 612 are both lower than the respective first and second (high and low) impedance values 604 and 606, the difference 608 may be larger than the difference 602 relative to the corresponding high 610/604 or corresponding low impedance values 612/606. In this way, discontinuing providing power or reducing the power provided to the chargeable device and/or the battery 436 of the chargeable device while performing in-band signaling may increase the signal-to-noise ratio of the in-band communications, making such communications more robust and reliable.

Figure 7:
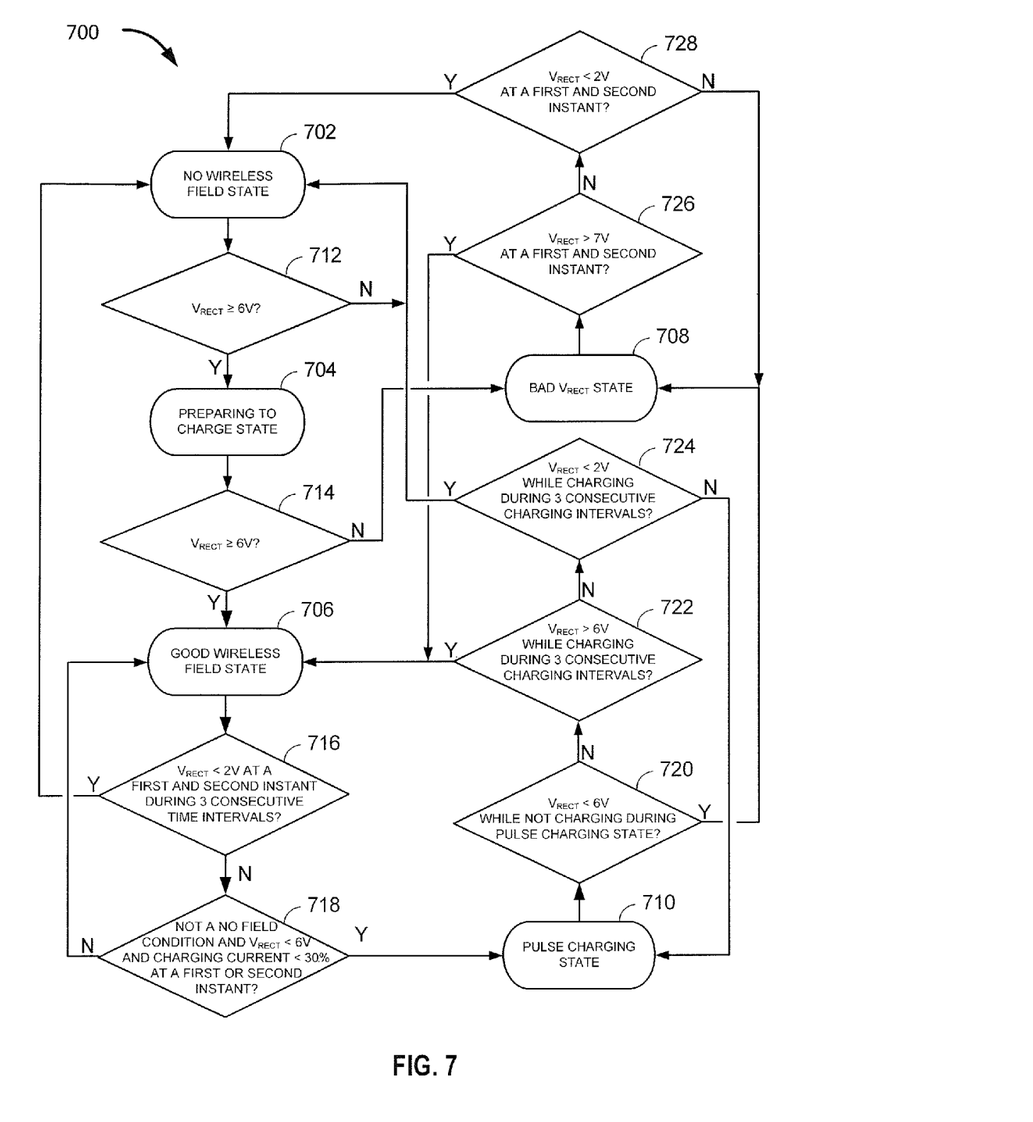
FIG. 7 illustrates a flowchart of a state diagram for providing wireless power in the wireless power transfer system of FIG. 4.

FIG. 7 illustrates a flowchart 700 of a state diagram for providing wireless power in the wireless power transfer system of FIG. 4. The state diagram of flowchart 700 is described herein with reference to the wireless power transfer system 400, as previously described in connection with FIGS. 4 and 5. In an implementation, one or more of the blocks in flowchart 700 may be performed by a controller (e.g., the controller circuit 438 of the receiver 408 of FIG. 4). Although the state diagram of flowchart 700 is described herein with reference to a particular order, in various embodiments, blocks herein may be performed in a different order, or omitted, and additional blocks may be added.

The state diagram may begin at block 702, which signifies a "no wireless field" state. In some implementations, the "no wireless field" state 702 corresponds to the interval 512 of FIG. 5, where no receiver 408 is sensed by the transmitter 404. In the "no wireless field" state, a "charge enable" indication within the receiver 408 may be set to "0" (e.g., set in the negative), indicating that power provision or charging is NOT currently enabled.

At block 712, a determination is made as to whether the rectified voltage $V_{RECT}$ (see FIG. 4) is greater than 6V. Although the exemplary value of 6V is utilized here, the present application is not so limited and may be any value sufficient to indicate that a wireless field is present having a strength sufficient to power a chargeable device or charge a battery 436 attached to the receiver 408 and sufficient for the transmitter 404 to differentiate between the low load impedance and the high load impedance during in-band signaling. If the determination is NO, the flowchart advances back to block 702. If the determination is YES, the flowchart advances to block 704.

Block 704 corresponds to a "preparing to charge" state. In such a state, the receiver 408 may set an indication to "1" (e.g., set in the positive) that the receiver 408 has entered a wireless power field 405. The receiver 408 may additionally set a "preparing to charge" indication to "1" (e.g., set in the positive). The "charge enable" indication may also be set to "1" (e.g., set in the positive). In some implementations, the receiver 408 may additionally begin transmitting an in-band signal to the transmitter 404 at a predetermined periodicity (e.g., once every second) to notify the transmitter 404 that the receiver 408 is still present in the wireless field 405 and to continue providing wireless power. The flowchart 700 may then advance to block 714.

Block 714 includes determining whether $V_{RECT}$ (see FIG. 4) is greater than the 6V value, as previously described in connection with block 710. If the determination is NO, the flowchart may advance to block 708, where the receiver 408 enters a "bad $V_{RECT}$ state", an indication of the "bad $V_{RECT}$ state" may be set to "1" (e.g., set in the positive), the "charge enable" indication may be set to "0" (e.g., set in the negative), and provision of power to the chargeable device or charging of the battery 436 is discontinued. If the determination at block 714 is YES, the flowchart 700 may advance to block 706.

Block 706 may correspond to a "good wireless field" state, which may correspond to the interval 508, as previously described in connection with FIG. 5. In the "good wireless field" state, the "charge enable" indication may remain set to "1" (e.g., set in the positive). The receiver 408 may additionally continue to perform the in-band signaling with the duration and periodicity, as previously described in connection with block 704. From block 706, the flowchart 700 may advance to block 716.

At block 716, a determination may be made as to whether $V_{RECT}$ (see FIG. 4) is less than 2V at a first and second instant during each of three consecutive time intervals. In some implementations, the first and second instants may be temporally separated from one another by approximately 500 ms and the time intervals may each be 1 second in length. Such a 1 second length may correspond to the receiver 408 being configured to communicate with the transmitter 404 every second, via in-band signaling, to notify the transmitter 404 that the receiver 408 is still present in the wireless field of the transmitter 404. Thus, the time intervals may be any value corresponding to a periodicity of in-band signaling for which the receiver 408 is configured. Although the value of 2V is utilized here, the present application is not so limited and any value may be utilized such that a $V_{RECT}$ of less than the value would reliably indicate that no wireless field 405 is present. $V_{RECT}$ may fall below this value if the receiver 408 is removed from the wireless field 405 generated by the transmitter 404 for wirelessly transmitting power or if the transmitter 404 discontinues generating the wireless field 405 in response to a determination that the receiver 408 is no longer present (e.g., when the receiver 408 has not communicated with the transmitter 404 via the in-band signaling for a certain predetermined period of time). Thus, the determination at block 716 is a determination of the presence of a wireless field 405 from which wireless power may be received. As previously described in connection with FIG. 5, when the transmitter is in the "beacon mode" the transmitter 404 may not generate the wireless field 405 except for a short period during each beacon interval (e.g., for only 100 ms every second).

To avoid a false NO determination at 716, (e.g., a determination that the wireless field is present when in actuality the transmitter 404 is merely transmitting a beacon in the "beacon mode") the receiver 408 may be configured to sense $V_{RECT}$ at each of two instants during the 1 second interval. If the transmitter 404 is in the "beacon mode," $V_{RECT}$ will be greater than or equal to 2V during at most only one of the two instants and the determination will still be NO. Since moving to the "no wireless field" state of block 702 will necessarily cause the receiver 408 to discontinue providing power to the chargeable device or battery 436 for an extended period of time, it may be desirable to ensure that the wireless field 405 is not merely transiently absent at this time. For this reason, the determination of block 716 may require $V_{RECT}$ to be less than 2V in both instants of each of a plurality of consecutive time frames (e.g., 3 consecutive time frames as shown in block 716, though any number greater than 1 may be utilized). Thus, if the determination at block 716 is YES, the receiver 408 may have reliably determined that a wireless field 405 is not present and the flowchart may transition back to block 702. However, if the determination at block 716 is NO, the flowchart 700 may advance to block 718.

At block 718, a determination may be made as to whether the receiver 408 is NOT in a "no wireless field" condition while $V_{RECT}$ is less than 6V and the charging current $I_{RECT}$ (see FIG. 4) is less than 30% of a maximum current value in either of the first or second instants of at least a single interval, as previously described in connection with block 716. Although the value of 30% is utilized here, the present application is not so limited and any percentage value may be utilized. Moreover, the maximum current may be a maximum current that the chargeable device or battery 436 may accept during provision of power or charging, or alternatively, a maximum current that the receiver 408 is capable of providing to the chargeable device or battery 436. If the determination is NO, the flowchart 700 may advance back to block 706. If the determination is YES at block 718, the flowchart 700 may advance to block 710 to enter a "pulse charging" state.

In the "pulse charging" state of block 710, the receiver 408 may continuously receive wireless power from the transmitter 404 but may only provide the rectified current $I_{RECT}$ to the chargeable device or battery 436 when the receiver 408 is not communicating with the transmitter 404 via in-band signaling, as previously described in connection with FIG. 5. Thus, the "charge enable" indication may be toggled from "1" or a positive indication to a "0" or a negative indication based on whether the receiver 408 is providing power to the chargeable device or battery 436 at the particular moment. From block 710, the flowchart may advance to block 720.

At block 720, a determination may be made as to whether $V_{RECT}$ is less than the 6V value, as previously described in each of blocks 712, 714 and 718, during an interval of the "pulse charging state" that the receiver 408 is not providing $V_{RECT}/I_{RECT}$ to the chargeable device or battery 436 (e.g., the receiver 408 is performing in-band signaling with the transmitter 404 and is either not providing power or providing a reduced amount of power to the chargeable device or charging the battery 436). If the determination is YES, the flowchart 700 may advance to block 708, where the receiver 408 may enter a "bad $V_{RECT}$ state." If the determination is NO, the flowchart 700 may alternatively advance to block 722.

At block 722, a determination may be made as to whether $V_{RECT}$ is greater than the 6V, as previously described in each of blocks 712, 714, 718 and 720, while the receiver 408 is providing power to the chargeable device or charging the battery 436 during each of 3 consecutive charging intervals. For example, as previously described, during the "pulse charging" state the receiver 408 may discontinue providing power to the chargeable device or charging the battery 436 while in-band signaling. Thus, the determination of block 722 may essentially be a determination as to whether a good wireless field 405 is present when the receiver 408 is actually providing power to the chargeable device or charging the battery 436. If the determination is YES, the flowchart 700 may advance back to block 706. If the determination is NO, the flowchart may alternatively advance to block 724.

At block 724, a determination may be made as to whether $V_{RECT}$ is less than the 2V, as previously described in connection with block 716, while the receiver 408 is providing power to the chargeable device or charging the battery 436 during each of the 3 consecutive charging intervals, as previously described in connection with block 722. If the determination is YES, the flowchart 700 may advance back to block 702. If the determination is NO, the flowchart 700 may alternatively advance back to block 710.

From block 708, which is the "bad $V_{RECT}$" state, the flowchart 700 advances to block 726, where a determination may be made as to whether $V_{RECT}$ is greater than 7V at the first and second instants of at least one time interval, as previously described in connection with block 718. If the determination is YES, the flowchart 700 advances back to the "good wireless field" state of block 706. If the determination is NO, the flowchart 700 may alternatively advance to the block 728.

At block 728 a determination may be made as to whether $V_{RECT}$ is alternatively less than the 2V, as previously described in connection with blocks 716 and 724, during the first and second instants of the at least one time interval, as previously described in connection with block 726. If the determination is YES, the flowchart 700 may advance back to the "no wireless field" state of block 702. If the determination is NO, the flowchart 700 may alternatively advance back to the "bad $V_{RECT}$" state of block 708. Accordingly, the receiver 408 may transition between the "no wireless field," the "preparing to charge," the "good wireless field," the "pulse charging," and the "bad VRECT" states depending on the previous state of the receiver 408 and the values of $V_{RECT}$ (and in some circumstances $I_{RECT}$) during at least one instant in at least one time interval, as described above.

Figure 8:
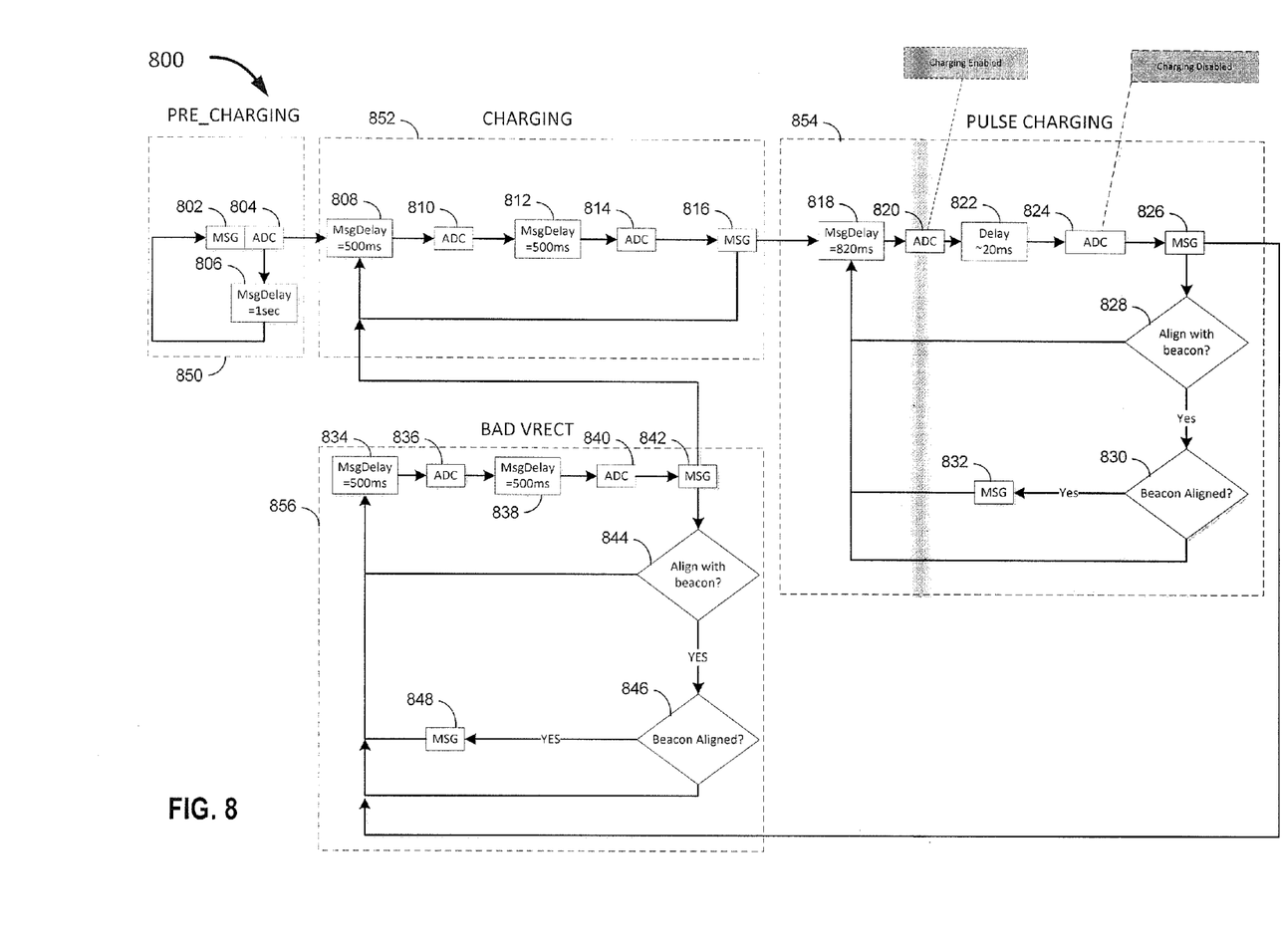
FIG. 8 illustrates a flowchart for providing wireless power in the wireless power transfer system of FIG. 4.

FIG. 8 illustrates a flowchart 800 for providing wireless power in the wireless power transfer system of FIG. 4. The flowchart 800 is described herein with reference to the wireless power transfer system 400, as previously described in connection with FIGS. 4 and 5, as well as the flowchart 700, as previously described in connection with FIG. 7. In an implementation, one or more of the blocks in the flowchart 800 may be performed by the controller circuit 438 and/or by the sensor circuit 437 of the receiver 408 of FIG. 4. Although the flowchart 800 is described herein with reference to a particular order, in various embodiments, blocks herein may be performed in a different order, or omitted, and additional blocks may be added.

For the purpose of the flowchart 800, each of the blocks that have the letters "MSG" may correspond to the receiver 408 of FIG. 4 utilizing in-band signaling with the transmitter 404 to indicate to the transmitter 404 that the receiver 408 is present in the wireless field generated by the transmitter 404 and/or to communicate information to the transmitter 404. Similarly, any block having the letters "ADC" may correspond to the receiver 408 utilizing the sensor circuit 437 to measure one or both of $V_{RECT}$ and $I_{RECT}$ (see FIG. 4) and utilizing an analog-to-digital converter (i.e., ADC) to convert the analog measurement of $V_{RECT}$ and/or $I_{RECT}$ to corresponding digital values that may be utilized by the receiver 408 to make one or more of the determinations, as previously described in connection with FIG. 7.

The flowchart 800 shows a "Pre-Charging" state 850, a "Charging" state 852, a "Pulse Charging" state 854, and a "Bad $V_{RECT}$" state 856, corresponding to the similar states in blocks 704, 706, 710 and 708 of FIG. 7, respectively. For example, blocks 802, 804 and 806 may correspond to the "Pre-Charging" state 850 that may correspond in some aspects to block 702 in FIG. 7. Blocks 808, 810, 812, 814 and 816 may correspond to the "Charging" state 852 that may correspond in some aspects to block 706 in FIG. 7. Blocks 818, 820, 822, 824, 826, 828, 830 and 832 may correspond to the "Pulse Charging" state 854 that may correspond in some aspects to block 710 in FIG. 7. And blocks 834, 836, 838, 840, 842, 844, 846 and 848 may correspond to the "Bad $V_{RECT}$" state 856 that may correspond in some aspects to block 708 in FIG. 7.

The flowchart 800 may begin in the "Pre-Charging" state 850 with block 802, where a message is transmitted by the receiver 408 to the transmitter 404 via in-band signaling. The flowchart 800 then advances to block 804 where the receiver 408 measures $V_{RECT}$ and, utilizing the ADC (e.g., the ADC within the sensor circuit 437 of FIG. 4), converts an analog measurement of $V_{RECT}$ to a digital representation for comparing to a particular voltage, as previously described in connection with block 714 FIG. 7. If the receiver 408 remains in the "Pre-Charging" state 850 the flowchart advances to block 806, where a delay is implemented before advancing back to block 802. In some implementations, the delay may be approximately 1 second, such that, in the "Pre-Charging" state 850, the receiver 408 continuously sends a message to the transmitter 404 in 1 second intervals. If the receiver 408 transitions to the "Charging" state 852, the flowchart 800 advances from block 804 to block 808.

In the "Charging" state 852, at block 808, the receiver 408 may implement a delay (e.g., a 500 ms delay) after transmitting the message at 802, and then advances to block 810, where the receiver 408 measures $V_{RECT}$ and possibly $I_{RECT}$ (see FIGS. 4 and 7) and converts the analog measurement into a digital representation via the ADC circuit (e.g., the ADC within the sensor circuit 437 of FIG. 4). The flowchart 800 advances to block 812, where the receiver 408 may implement another delay (e.g., a 500 ms delay) before advancing to block 814. At block 814 the receiver 408 may measure $V_{RECT}$ and possibly $I_{RECT}$ again and convert the analog measurement into a digital representation via the ADC circuit. From block 814, the flowchart 800 advances to block 816, where the receiver 408 transmits another message to the transmitter 404 via in-band signaling. If the flowchart 800 remains in the charging state 852, the flowchart 800 may advance from block 816 back to block 808. The measurements made at blocks 810 and 814 may correspond to the $V_{RECT}$ and/or $I_{RECT}$ measurements made at the first and second instants, as previously described in connection with blocks 716 and 718 of FIG. 7. If the flowchart 800 transitions from the "Charging" state 852 to the "Pulse Charging" state 854, the flowchart 800 advances from block 816 to block 818.

In the "Pulse Charging" state 854, at block 818, the receiver 408 may implement a delay (e.g., a 820 ms delay) after transmitting the message at 816, and then advances to block 820, where the receiver 408 may measure $V_{RECT}$ and convert the analog measurement into a digital representation via the ADC circuit. This measurement may be conducted while the receiver 408 is providing power to the chargeable device or charging the battery 436 (see FIG. 4). The measurement at block 820 may correspond to the determination of blocks 722 and 724, as previously described in connection with FIG. 7. The flowchart 800 then advances to block 822 where the receiver 408 may implement another delay (e.g., a 20 ms delay) and then advance to block 824, where the receiver 408 again measures $V_{RECT}$ and converts the analog measurement into a digital representation via the ADC circuit. This measurement may be conducted while the receiver 408 is not providing power to the chargeable device or charging the battery 436, although the receiver 408 is still receiving power wirelessly from the transmitter 404. The measurement at block 824 may correspond to the determination of block 720, as previously described in connection with FIG. 7. The flowchart 800 then advances to block 826, where the receiver 408 transmits a message to the transmitter 404 via in-band signaling.

If the flowchart 800 remains in the "Pulse Charging" state 854, the flowchart 800 advances to block 828, where the receiver 408 may make a determination as to whether the measurements at blocks 820 and 824 need to be aligned with the beacon transmissions characteristic of the pulse charging state 854 in the next pass. For example, as previously described in connection with FIG. 7, the receiver 408 may measure $V_{RECT}$ when the receiver 408 is providing power to the chargeable device or charging to battery 436 (e.g., at blocks 722 and 724) and when the receiver 408 is not providing power to the chargeable device or charging the battery 436 (e.g., at block 720). Thus, the blocks 820 and 824 may measure $V_{RECT}$ and analog to digital convert the measurements while the receiver is providing power or charging (e.g., during a beacon) and while the receiver 408 is not providing power or charging, respectively. Such measurements at the block 820 should occur at a time aligned with provision of power to the chargeable device or charging of the battery 436. If the determination at block 828 is NO, the measurement block 820 is occurring during a charging pulse while the block 824 is occurring outside of any charging pulse and the flowchart 800 may advance directly back to block 818. If the determination at block 828 is YES, alignment with the charging pulses may be desired and the flowchart 800 may advance to block 830. The receiver 408 may align measurements with the charging pulses (e.g., beacons) by halting an internal clock until the next charging pulse occurs and restarting the internal clock at the occurrence of the next charging pulse.

At block 830, the receiver 408 may make a determination as to whether the measurement at block 820 is currently aligned with a charging pulse (e.g., beacon). If the determination is YES, the flowchart 800 may advance to block 832 where the receiver 408 may transmit another message via in-band signaling, and then advance back to block 818. If the determination at block 830 is NO, the flowchart 800 may advance directly back to block 818.

Turning to block 826, if the flowchart 800 does not remain in the "Pulse Charging" state 854, the flowchart may advance from block 826 to block 834, where the receiver 408 may enter the "Bad $V_{RECT}$" state or state 856. At block 834, a delay (e.g., 500 ms) may be implemented before advancing to block 836, where the receiver 408 may measure $V_{RECT}$ and convert the analog measurement to a digital value. The flowchart 800 may then advance to block 838 where another delay (e.g., 500 ms) may be implemented before advancing to block 840, where the receiver 408 may again measure $V_{RECT}$ and convert the analog measurement to a digital value. The measurements at blocks 836 and 840 may correspond to the measurements utilized in the determination of blocks 726 and 728 of FIG. 7. The flowchart 800 may then advance to block 844 where the receiver 408 may make a determination as to whether the measurements at blocks 836 and 840 need to be aligned with the beacon transmissions in the next pass, characteristic of the "beacon" mode when the transmitter 404 does not sense the presence of the receiver 408 for a predetermined period of time (e.g., 5 seconds) and substantially turns off wireless power transmission to conserve power. The operation of blocks 844, 846 and 848 may substantially correspond to those of blocks 828, 830 and 832, as previously described, except that the flowchart 800 then advances back to the message delay block 834 rather than the message delay block 818.

Turning to block 842, if the flowchart 800 does not remain in the "Bad $V_{RECT}$" state 856, the flowchart 800 may advance from block 842 back to block 808 and the receiver 408 may transition from the "Bad $V_{RECT}$" state 856 to the "Charging" state 852.

Figure 9:
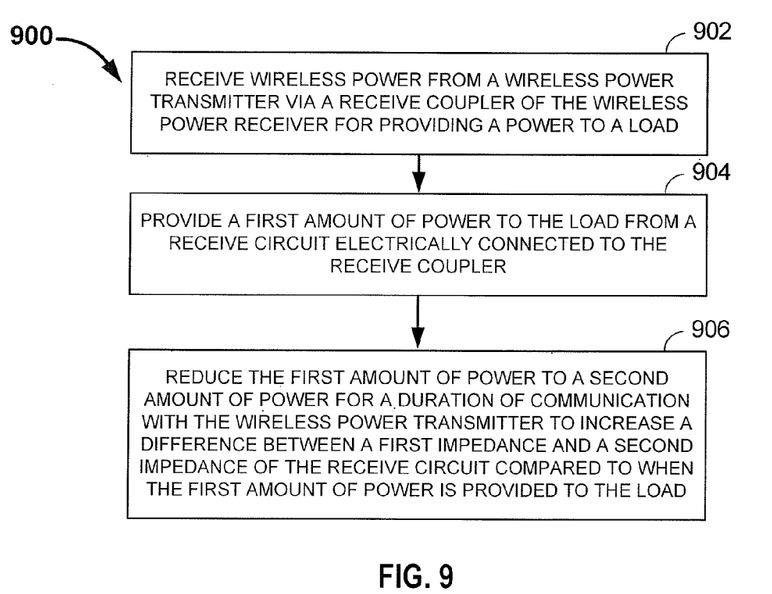
FIG. 9 illustrates a flowchart for a method for receiving wireless power by the wireless power receiver of FIG. 4.

FIG. 9 is illustrates a flowchart 900 for a method for receiving wireless power by the wireless power receiver 408 of FIG. 4. In an implementation, one or more of the blocks in flowchart 900 may be performed by the controller circuit 438 (FIG. 4). Although the method of flowchart 900 is described herein with reference to a particular order, in various embodiments, blocks herein may be performed in a different order, or omitted, and additional blocks may be added. Block 902 may include receiving wireless power from the wireless power transmitter 404 (FIG. 4) via the receive coupler 418 of the wireless power receiver 408 for providing a power to a load (e.g., the chargeable device or the battery 436 of the chargeable device). The method may then advance to block 904.

Block 904 includes providing a first amount of power to the load (e.g., the battery 436) from a receive circuit 410 electrically connected to the receive coupler 418. For example, when in the "Pulse Charging" state 854, as previously described, the controller circuit 438 may direct or permit the receive circuit 410 to provide power to the battery 436 and/or to the chargeable device of FIG. 4.

Block 906 includes reducing the first amount of power to a second amount of power for a duration of communication with the wireless power transmitter 404 to increase a difference (e.g., the difference 608 of FIG. 6) between a first impedance (e.g., the impedance 610) and a second impedance (e.g., the impedance 612) of the receive circuit 410 compared to when the first amount of power is provided to the load (e.g., as compared to the difference 602 between the first impedance 604 and the second impedance 606). The communication may comprise transmitting one or more messages, as previously described in connection with FIGS. 7 and 8, utilizing in-band signaling.

Figure 10:
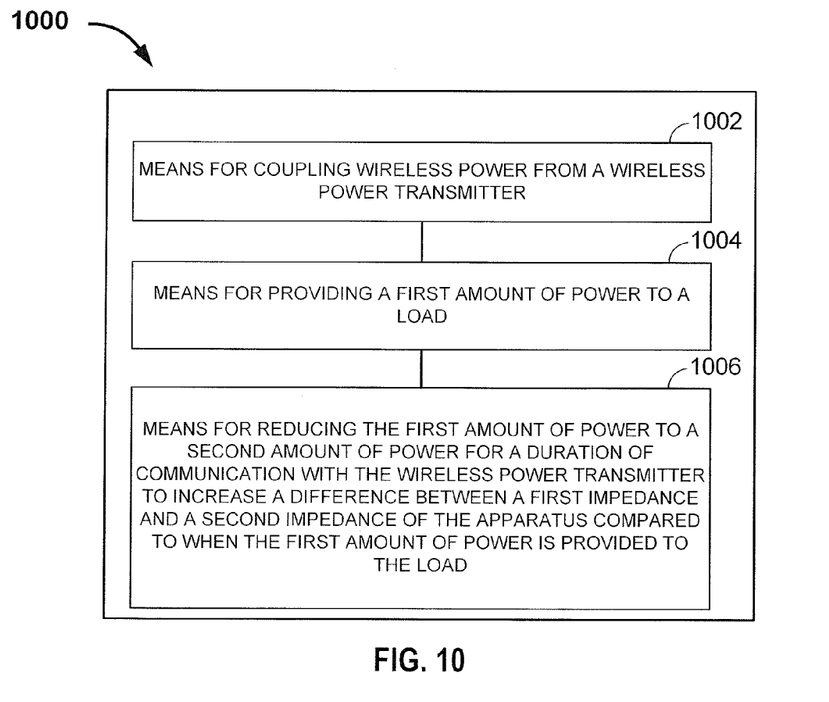
FIG. 10 is a functional block diagram of an apparatus for receiving wireless power, in accordance with an exemplary implementation.

FIG. 10 is a functional block diagram of an apparatus 1000 for receiving wireless power, in accordance with an exemplary implementation. The apparatus 1000 comprises means 1002, means 1004, and means 1006 for the various actions previously discussed with respect to FIGS. 4-9. The apparatus 1000 includes means 1002 for coupling wireless power from a wireless power transmitter. In an implementation, the means 1002 may be configured to perform one or more of the functions discussed above with respect to block 902 of FIG. 9. In various implementations, the means 1002 may be implemented by the receive coupler 418 (FIG. 4).

The apparatus 1000 further includes means 1004 for providing a first amount of power to a load. In some implementations, the means 1004 may be configured to perform one or more of the functions discussed above with respect to block 904 of FIG. 9. In various implementations, the means 1004 may be implemented by the receive circuit 410 and/or the controller circuit 438 (FIG. 4).

The apparatus 1000 further includes means 1006 for reducing the first amount of power to a second amount of power for a duration of communication with the wireless power transmitter to increase a difference between a first impedance and a second impedance of the apparatus 1000 compared to when the first amount of power is provided to the load. In some implementations, the means 1006 may be configured to perform one or more of the functions discussed above with respect to block 906 of FIG. 9. In various implementations, the means 1006 may be implemented by the receive circuit 410 and/or the controller circuit 438 (FIG. 4).

The various operations of methods, flowcharts, and state diagrams described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. For purposes of summarizing the disclosure, certain aspects, advantages and novel features of the inventions have been described herein. It is to be understood that not necessarily all such advantages may be achieved in accordance with any particular implementation of the invention.

Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for receiving wireless power, the apparatus comprising:
   a receive coupler configured to receive the wireless power from a wireless power transmitter;
   a receive circuit electrically connected to the receive coupler, the receive, circuit configured to provide power to a load; and
   a controller circuit configured to:
      provide a first amount of power from the receive circuit to the load, and
      reduce, in response to determining that a level of coupling between the receive coupler and the wireless power transmitter is below a threshold, the first amount of power to a second amount of power for a duration of communication with the wireless power transmitter to increase a difference between a first impedance and a second impedance of the receive circuit compared to when the first amount of power is provided to the load.

2. The apparatus of claim 1, wherein reducing the first amount of power to the second amount of power comprises discontinuing providing power from the receive circuit to the load.

3. The apparatus of claim 1, wherein the communication comprises in-band signaling via a field used to receive the wireless power from the wireless power transmitter.

4. The apparatus of claim 1, wherein reducing the first amount of power to the second amount of power for the duration of the communication with the wireless power transmitter reduces a level of interference detectable at the wireless power transmitter caused by variations in the impedance of the load.

5. The apparatus of claim 4, wherein reducing the level of interference increases an accuracy of detecting a presence of the apparatus by the wireless power transmitter.

6. The apparatus of claim 1, wherein the apparatus is configured to operate in a pulse charging state wherein the receive circuit is configured to provide the power to the load except for the duration of the communication.

7. The apparatus of claim 1, comprising a sensor circuit configured to sense a voltage generated by the receive circuit at each of a first time instant and a second time instant during a periodic interval, wherein the controller circuit is further configured to determine whether the wireless power transmitter is operating in a beacon mode based on the sensed voltage at each of the first time instant and the second time instant.

8. The apparatus of claim 7, wherein the wireless power transmitter periodically transmits a beacon for sensing a presence of the apparatus during the beacon mode.

9. The apparatus of claim 8, wherein the controller circuit is further configured to adjust a timing of transmission of a message communicated to the wireless power transmitter to align the message with the beacon transmitted by the wireless power transmitter when the wireless power transmitter is operating in the beacon mode.

10. The apparatus of claim 1, wherein at least a portion of the load comprises a battery.

11. A method for receiving wireless power by a wireless power receiver, the method comprising:
    receiving wireless power from a wireless power transmitter via a receive coupler of the wireless power receiver for providing power to a load,
    providing a first amount of power to the load from a receive circuit electrically connected to the receive coupler, and
    reducing, in response to determining that a level of coupling between the receive coupler and the wireless power transmitter is below a threshold, the first amount of power to a second amount of power for a duration of communication with the wireless power transmitter to increase a difference between a first impedance and a second impedance of the receive circuit compared to when the first amount of power is provided to the load.

12. The method of claim 11, wherein reducing the first amount of power to the second amount of power comprises discontinuing providing power from the receive circuit to the load.

13. The method of claim 11, wherein the communication comprises in-band signaling via a field used to receive the wireless power from the wireless power transmitter.

14. The method of claim 11, wherein reducing the first amount of power to the second amount of power for the duration of the communication with the wireless power transmitter reduces a level of interference detectable at the wireless power transmitter caused by variations in the impedance of the load.

15. The method of claim 14, wherein reducing the level of interference increases an accuracy of detecting a presence of the wireless power receiver by the wireless power transmitter.

16. The method of claim 11, comprising receiving the wireless power from the wireless power transmitter in a pulse charging state comprising providing the power to the load except for the duration of the communication.

17. The method of claim 11, comprising:
    sensing a voltage generated by the receive circuit at each of a first time instant and a second time instant during a periodic interval, and
    determining whether the wireless power transmitter is operating in a beacon mode based on the sensed voltage at each of the first and second time instants.

18. The method of claim 17, wherein the wireless power transmitter periodically transmits a beacon for sensing a presence of the wireless power receiver during the beacon mode.

19. The method of claim 18, comprising adjusting a timing of transmission of a message communicated to the wireless power transmitter to align the message with the beacon transmitted by the wireless power transmitter when the wireless power transmitter is operating in the beacon mode.

20. A non-transitory computer-readable, medium comprising code that, when executed, causes a wireless power receiver to:
    receive wireless power from a wireless power transmitter via a receive coupler of the wireless power receiver for providing power to a load,
    provide a first amount of power to the load from a receive circuit electrically connected to the receive coupler, and reduce, in response to determining that a level of coupling between the receive coupler and the wireless power transmitter is below a threshold, the first amount of power to a second amount of power for a duration of communication with the wireless power transmitter to increase a difference between a first impedance and a second impedance of the receive circuit compared to when the first amount of power is provided to the load.

21. The medium of claim 20, wherein reducing the first amount of power to the second amount of power comprises discontinuing providing power from the receive circuit to the load.

22. The medium of claim 20, wherein the communication comprises in-band signaling via a field used to receive the wireless power from the wireless power transmitter.

23. The medium of claim 22, wherein reducing the first amount of power to the second amount of power for the duration of the communication with the wireless power transmitter reduces a level of interference detectable at the wireless power transmitter caused by variations in the impedance of the load.

24. The medium of claim 20, wherein the code, when executed, causes the wireless power receiver to receive the wireless power from the wireless power transmitter in a pulse charging state comprising providing the power to the load except for the duration of the communication.

25. An apparatus for receiving wireless power, the apparatus comprising:
   means for coupling wireless power from a wireless power transmitter;
   means for providing a first amount of power to a load; and
   means for reducing, in response to determining that a level of coupling between the coupling means and the wireless power transmitter is below a threshold, the first amount of power to a second amount of power for a duration of communication with the wireless power transmitter to increase a difference between a first impedance and a second impedance of the apparatus compared to when the first amount of power is provided to the load.

26. The apparatus of claim 25, wherein the means for reducing the first amount of power to the second amount of power is configured to discontinue providing power from the means for providing the first amount of power to the load for the duration of the communication with the wireless power transmitter.

27. The apparatus of claim 25, further comprising means for selectively toggling between the first and second impedances of the apparatus to perform the communicating with the wireless power transmitter as in-band signaling via a field used to receive the wireless power from the wireless power transmitter.

* * * * *